United States Patent [19]

Gross et al.

[11] Patent Number: 5,153,382
[45] Date of Patent: Oct. 6, 1992

[54] EXTRUSION OF THERMOPLASTIC COPOLYMERS

[75] Inventors: Laurence H. Gross, Bridgewater, N.J.; Jeffrey D. Umpleby, Prevessin, France

[73] Assignee: Union Carbide Chemicals & Plastics Technology Corporation, Danbury, Conn.

[21] Appl. No.: 686,949

[22] Filed: Apr. 18, 1991

[51] Int. Cl.$^5$ .............................................. H01B 3/46
[52] U.S. Cl. ..................... 174/110 SR; 174/110 PM; 174/120 SR; 428/375
[58] Field of Search ..... 174/110 R, 110 SR, 110 PM, 174/120 SR; 428/375, 378

[56] References Cited

U.S. PATENT DOCUMENTS

| | | | |
|---|---|---|---|
| 4,297,310 | 10/1981 | Akutsu et al. | 525/326.5 |
| 4,397,981 | 8/1983 | Doi et al. | 174/110 PM X |
| 4,840,983 | 6/1989 | Vincent | 174/110 SR X |
| 4,894,284 | 1/1990 | Yamanouchi et al. | 174/110 PM X |
| 4,937,284 | 6/1990 | Bergstrom | 525/57 |
| 4,983,675 | 1/1991 | Ishino et al. | 525/326.5 X |
| 5,034,278 | 7/1991 | Turbett | 428/450 |
| 5,047,476 | 9/1991 | Keogh | 525/106 |

*Primary Examiner*—Morris H. Nimmo
*Attorney, Agent, or Firm*—S. R. Bresch

[57] ABSTRACT

A process for extruding a thermoplastic polymer comprising:
(a) introducing into an extruder a copolymer of ethylene wherein one of the copolymerized monomers has the following formula:

$$CH_2=C[(CH_2)_n-CH_3]-Si(OR)_3$$

wherein each
R is independently a saturated aliphatic group having 1 to 4 carbon atoms; and
n is 0, 1 or 2;
(b) extruding the copolymer of step (a); and, thereafter,
(c) contacting the extrudate with sufficient moisture to effect crosslinking.

2 Claims, No Drawings

EXTRUSION OF THERMOPLASTIC COPOLYMERS

TECHNICAL FIELD

This invention relates to a process for the extrusion of hydrolyzable thermoplastic copolymers.

BACKGROUND INFORMATION

Scorch, the premature crosslinking of resin, is a concern in the extrusion of hydrolyzable silane/ethylene addition copolymers. The effect of scorch is to generate nonsmooth extrudates as the resin is processed. One theory for the cause of scorch is that hydroperoxide formation occurs at the tertiary hydrogen on the carbon adjacent to the silicon atom. Unfortunately, the available silane modified ethylene resins, e.g., those ethylene homopolymers or copolymers, which are products of the copolymerization of vinyl trialkoxy silanes with ethylene, are prone to scorch, and precautions have to be taken to ameliorate the effect.

DISCLOSURE OF THE INVENTION

An object of this invention, therefore, is to provide an extrusion process in which premature crosslinking is essentially avoided through the use of a silane modified ethylene resin, which is resistant to hydroperoxide formation and hence to scorch.

Other objects and advantages will become apparent hereinafter.

According to the present invention the above object is met by a process for extruding a thermoplastic polymer comprising:

(a) introducing into an extruder a copolymer of ethylene wherein one of the copolymerized monomers has the following formula:

$$CH_2=C[(CH_2)_n-CH_3]-Si(OR)_3$$

wherein each
R is independently a saturated aliphatic group having 1 to 4 carbon atoms; and
n is 0, 1 or 2;

(b) extruding the copolymer of step (a) and, thereafter, (c) contacting the extrudate with sufficient moisture to effect crosslinking.

DETAILED DESCRIPTION

The scorch resistant resin, which can be utilized in the extrusion process of the invention, is a copolymer of ethylene, the heretofore described silane monomer, and, optionally, one or more alpha-olefins and/or diolefins. It is understood that the term "copolymer" is a polymer produced from two or more comonomers and, thus, includes terpolymers, tetramers, etc. The alpha-olefin comonomers can have 3 to 12 carbon atoms, and preferably have 3 to 8 carbon atoms. The diolefin comonomers can have 4 to 20 carbon atoms and preferably have 4 to 9 carbon atoms. The percentage of monomers on which these scorch resistant resins are based are about as follows:

| monomer | broad | preferred |
|---|---|---|
| | (weight percent) | |
| ethylene | 75 to 99.8 | 80 to 99.5 |
| silane | 0.2 to 5 | 0.5 to 2 |
| alpha-olefin | 0 to 20 | 0 to 18 |
| diolefin | 0 to 15 | 0 to 10 |

The percentages are based on the weight of the final resin product.

Examples of the alpha-olefins are propylene, 1-butene, 1-hexene, 4-methyl-1-pentene, and 1-octene. Examples of the diolefins are butadiene, 1,4-hexadiene, ethylidene norbornene, and dicyclopentadiene.

The ethylene/silane copolymers can be prepared by conventional methods, e.g., by the processes described in U.S. Pat. Nos. 3,225,018 or 4,574,133.

As noted, the silane used in the polymer of this invention has the following formula:

$$CH_2=C[(CH_2)_n-CH_3]-Si(OR)_3$$

wherein each R is independently a saturated aliphatic group having 1 to 4 carbon atoms and preferably 1 carbon atom; and n is 0, 1 or 2, and preferably 0.

Examples of the saturated aliphatic group are methyl, ethyl, propyl, isopropyl, butyl, and isobutyl. Examples of silane components suitable for use in subject process are 2-trimethoxysilyl propene; 2-triethoxysilyl propene; and 2-triisobutoxysilyl propene.

These silane compounds are prepared by conventional techniques. A typical preparation is described in the Journal of Organometallic Chemistry Reviews, volume 5, 1977, page 26. Another method for preparing the silane is carried out by contacting, for example, vinyltrimethoxysilane with bromine and quinoline and then contacting the intermediate product with Li-Cu(CH$_3$)$_2$ under appropriate conditions.

The ethylene/silane copolymers discussed above are hydrolyzable and, thus, can be cured or crosslinked by exposing the polymers to moisture. The moisture in the atmosphere is usually sufficient to permit curing to occur over a reasonable period of time, especially when a silanol condensation catalyst has been added to the copolymer; however, the moisture cure is more effectively carried out by soaking the resin in a water bath, or using a sauna or a continuous vulcanizable tube. Again, the silanol condensation catalyst is added to reduce the curing time.

Examples of silanol condensation catalysts are dibutyl tin dilaurate, dioctyl tin maleate, dioctyl tin dilaurate, stannous acetate, stannous octoate, lead napthenate, zinc octoate, iron 2-ethyl hexoate, and other metal carboxylates. Further acceleration of crosslinking can be accomplished by adding a cocatalyst such as tetramethoxy titanate, tetraisopropyl titanate, tetramethyl titanate, or other organo titanates mentioned in U.S. Pat. No. 4,446,279. The catalyst can be introduced into the composition in conventional amounts, typically about 0.005 to about 1 part by weight of primary catalyst per 100 parts by weight of polymer and about 0.25 to about 10 parts by weight of cocatalyst per 100 parts by weight of primary catalyst.

The process of the invention can be carried out in various types of extruders, e.g., a single screw type. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. If it has more than one barrel, the barrels are connected in series. The length to diameter ratio of each barrel is in the range of about 16:1 to about 30:1. For the purposes of this specification, it will be understood that the term "extruder" includes, in addition to conventional extruders, (i) injection molding apparatus, the die of the extruder being analogous to the injector of the injection molding apparatus and (ii) the combination of an extruder and a zone where foams are prepared. The zone follows the die and may be, for example, an oven. In wire coating, the die of the extruder is maintained at a temperature in the range of about 160° C. to about 240° C., and preferably in the range of about 170° C. to about 220° C. The same temperature ranges can be used in injection molding. The wire to be coated can be an electrical conductor or any medium for the transmission of communications such as a fiber optic material, e.g., glass fibers. Where a continuous vulcanizable tube is used in combination with the extruder, high pressure steam crosslinks the extruded product.

Conventional additives can be added to the polymer either before or during processing. The amount of additive is usually in the range of about 0.01 to about 50 percent based on the weight of the resin. Useful additives are antioxidants, ultraviolet absorbers, antistatic agents, pigments, carbon black, carbon black, dyes, fillers, slip agents, fire retardants, plasticizers, processing aids, lubricants, stabilizers, smoke inhibitors, halogen scavengers, flow aids, lubricants, and viscosity control agents. Blends of the hydrolyzable thermoplastic copolymer and other polymers can be prepared in the extruder provided that the resins to be blended with the hydrolyzable copolymer will not crosslink. Examples of these resins are low density polyethylene, high density polyethylene, and polypropylene.

Advantages of the invention are low scorch, fast cure, and good shelf stability.

The patents, patent applications, and publications mentioned in this specification are incorporated by reference herein.

The invention is illustrated by the following example:

EXAMPLE

Ethylene/2-trimethoxysilyl propene copolymer and ethylene/vinyltrimethoxysilane copolymer are compared for scorch (crosslinking stability) under extrusion conditions. The copolymers contain the same percentage of comonomers, and have the same density and the same melt indices.

100 parts of each of the copolymers are mixed with 2 parts of a hindered phenolic antioxidant and 0.1 part of dibutyl tin dilaurate in a Brabender TM mixer and then pelletized. The pellets of each composition are extruded separately in an extruder similar to that described above to sheets 0.15 inch thick. The temperature in the extruder is 180° C.

Each sheet is tested immediately after it comes out of the extruder in a rheometer at 182° C. The torque reading for the ethylene/2-trimethoxysilyl propene copolymer composition is 2 to 5 units whereas the torque reading for the ethylene/ vinyltrimethoxysilane copolymer composition is 6 to 10 units. This indicates that the ethylene/ 2-trimethoxysilyl propene copolymer composition is more stable, i.e. resistant to scorch, than the ethylene/vinyltrimethoxysilane copolymer composition.

We claim:

1. An article of manufacture comprising an electrical conductor or communications medium surrounded by at least one layer comprising a thermoplastic polymer consisting of copolymerized ethylene, a silane monomer, and, optionally, one or more other alpha olefin monomers and/or diolefins wherein said silane monomer is of the formula:

$$CH_2=C-[(CH_2)_n-CH_3]-Si(OR)_3$$

wherein each R is independently an alkyl group having 1 to 4 carbon atoms; and n is 0, 1, or 2.

2. The article of manufacture defined in claim 1 wherein the polymer is in a crosslinked state.

* * * * *

UNITED STATES PATENT AND TRADEMARK OFFICE
CERTIFICATE OF CORRECTION

PATENT NO. : 5,153,382

DATED : October 6, 1992

INVENTOR(S) : Gross et al

It is certified that error appears in the above-identified patent and that said Letters Patent is hereby corrected as shown below:

Column 4, line 44, add the following claims:

3. The article of manufacture defined in claim 1 wherein R is methyl.

4. The article of manufacture defined in claim 1 wherein n is 0.

5. The article of manufacture defined in claim 1 wherein the silane monomer is 2-trimethoxysilyl propene.

6. The article of manufacture defined in claim 1 wherein the reacted silane monomer is present in the polymer in an amount of about 0.2 to about 5 percent by weight based on the weight of the polymer.

7. The article of manufacture defined in claim 1 wherein the polymer consists of a copolymer of ethylene and 2-trimethoxysilyl propene.

8. The article of manufacture defined in claim 1 wherein the polymer consists of a copolymer of ethylene and 2-trimethoxysilyl propene wherein the copolymer is based on 75 to 99.8 percent by weight ethylene; 0.2 to 5 percent by weight silane; 0 to 20 percent by weight other alpha-olefins; and 0 to 15 percent by weight diolefin.

UNITED STATES PATENT AND TRADEMARK OFFICE
CERTIFICATE OF CORRECTION

PATENT NO. : 5,153,382

DATED : October 6, 1992

INVENTOR(S) : Gross et al

It is certified that error appears in the above-identified patent and that said Letters Patent is hereby corrected as shown below:

9. The article of manufacture defined in claim 1 wherein the polymer consists of a copolymer of ethylene and 2-trimethoxy-silyl propene wherein the copolymer is based on 80 to 99.5 percent by weight ethylene; 0.5 to 2 percent by weight silane; 0 to 18 percent by weight other alpha-olefins; and 0 to 10 percent by weight diolefin.

Signed and Sealed this

Thirtieth Day of November, 1993

Attest:

BRUCE LEHMAN

Attesting Officer

Commissioner of Patents and Trademarks